(12) United States Patent
Manabe et al.

(10) Patent No.: US 6,584,494 B1
(45) Date of Patent: Jun. 24, 2003

(54) COMMUNICATION SUPPORT METHOD AND COMMUNICATION SUPPORT SYSTEM

(75) Inventors: Ai Manabe, Kawasaki (JP); Satoshi Okuyama, Kawasaki (JP); Jun Kakuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/429,926

(22) Filed: Oct. 29, 1999

(30) Foreign Application Priority Data

Dec. 18, 1998 (JP) .......................................... 10-361489

(51) Int. Cl.[7] .............................................. G06F 15/16
(52) U.S. Cl. ...................... 709/204; 709/205; 709/207; 709/224; 370/260; 345/733
(58) Field of Search ................................ 709/206, 204, 709/207, 205, 318

(56) References Cited

U.S. PATENT DOCUMENTS

| | | | | |
|---|---|---|---|---|
| 5,493,692 A | * | 2/1996 | Theimer et al. | 455/26.1 |
| 5,634,005 A | * | 5/1997 | Matsuo | 709/206 |
| 5,793,365 A | * | 8/1998 | Tang et al. | 345/329 |
| 5,802,253 A | * | 9/1998 | Gross et al. | 706/47 |
| 5,987,503 A | * | 11/1999 | Murakami | 709/204 |
| 6,128,646 A | * | 10/2000 | Miloslavsky | 709/206 |
| 6,278,996 B1 | * | 8/2001 | Richardson et al. | 707/6 |
| 6,353,827 B1 | * | 3/2002 | Davies et al. | 707/6 |

FOREIGN PATENT DOCUMENTS

JP            8-140158        5/1996 ................. 709/224

OTHER PUBLICATIONS

Stephen Pollock, "A rule-based message filtering system" ACM Press New York, NY, USA pp.: 232-254 Periodical-Issue-Article Year of Publication: 1988 ISSN:1046-8188.*

"Social activity indicators for groupware" Ackerman, M.S.; Starr, B. Computer, vol.: 29 Issue: 6, Jun. 1996 pp.: 37-42.*

* cited by examiner

*Primary Examiner*—Dung C. Dinh
*Assistant Examiner*—Anita Choudhary
(74) *Attorney, Agent, or Firm*—Staas & Halsey LLP

(57) ABSTRACT

A method and associated system for promoting smooth communications in a chat system. A keyword list 3 stores keywords. A keyword-detection module 2 detects the sending of any keyword from another user terminal on any channel. A status-detection section 4, in response to the detection of a keyword, judges user status based on the status of the user terminal. A reporting module 9 sends the user status to the channel on which the keyword was sent. A report destination table 10 correlates the user status report destination with the keyword remark source And stores this information, and the reporting module 9 may report the user status to a report destination determined based on the report destination table. The real-time status of a user called by a keyword is reported, so as to support smoothly conducting conversations held in real time.

14 Claims, 16 Drawing Sheets

Fig. 3

EXAMPLE OF KEYWORD LIST

| Tanaka |
|---|
| Tamie |
| tana |
| all |

Fig. 4

EXAMPLE OF REPORT DESTINATION TABLE

| CALL SOURCE | oku | tana | sasa | suzu | yama |
|---|---|---|---|---|---|
| REPORT DESTINATION | oku | tana | sasa;tana | suzu | all |

Fig. 16

EXAMPLE OF KEYWORD DATABASE

| USER NAME | tana | katz | sasa | suzu | yama |
|---|---|---|---|---|---|
| KEYWORD | Tanaka | Katoh | Sasaki | Suzuki | Yamada |
| | Tamie | Ken | Sammy | Gino | Marie |
| | tana | all | sasa | suzu | yama |
| | all | katz | all | all | all |

FIG. 17

EXAMPLE OF REPORT DESTINATION DB

| CALLED USER | tana | | katz | | sasa | | suzu | | yama | |
|---|---|---|---|---|---|---|---|---|---|---|
| CALL SOURCE USER \ REPORT DEST. USER | oku | oku | oku | oku | katz | katz | oku | oku | oku | oku |
| | katz | katz; suzu | tana | suzu; tana | tana | tana | tana | katz; tana | tana | tana |
| | suzu | katz; suzu | suzu | sazu; tana | suzu | suzu | katz | katz; tana | suzu | suzu |
| | sasa | all | yama | yama | yama | yama | yama | yama | sasa | sasa |

COMMUNICATION SUPPORT METHOD AND COMMUNICATION SUPPORT SYSTEM

BACKGROUND OF THE INVENTION

1. Technical Field

The present invention relates to technology for promoting user conversation and smoothing the flow of communications in a system wherein a plurality of computer users mutually share the same network, enabling simultaneous conversation.

In the present invention, "chat system" refers to a system comprising a chat server and a plurality of chat clients, wherein chat clients share the same space and can conduct conversations. A "channel" refers to a virtual space shared by the chat clients. A "nickname" refers to identification information used to specify uniquely a user in the chat system.

2. Description of Related Art

In conventional chat systems, the conversations of channel participants are displayed lined in time series or within a described balloon. In addition to the conversations of channel participants, information is also displayed that indicates the fact that a user has joined or parted from a channel.

In addition to the aforementioned information, a chat system that can register users' self-status and user-specified keywords has been offered lately. In this chat system, the chat client detects whether a user-registered keyword is included in the remarks from another chat clients If a keyword is detected, the chat client consults the self-status previously set by the user, and notifies the other chat client that uttered the keyword of the user's self-status Examples of user self-status designations that are registered include "away from desk" and "absent." In addition, a chat system is also provided that gives notification not only of the self-status, but also of a predetermined message in accordance with the self-status.

The aforementioned chat system, wherein the self-status can be reported, has the following problems.

Since the user must set the self-status beforehand, the chat client cannot respond to the utterance of a keyword from another client if the user forgets to set his or her self-status. Moreover, unless a user sets self-status by him or herself, user status, such as the user's location and actions, will be completely unknown to other users. For example, even if a user sets the self-status to "absent" when leaving his or her desk, there is a tendency for the user to forget to reset the self-status to "present" upon returning. If a keyword is uttered by another chat client in this situation, even though the user himself or herself tries to respond, the chat client ends up sending a message to the effect that the user is absent.

Further, when someone is composing a long-text answer to remarks from other user(s), the other users will not realize that person's status—whether a response is being composed to their messages, whether the person is not at his or her desk, or whether he or she is busy running another application for example. These are aspects which therefore make it difficult to take full advantage of chat systems wherein conversations can be conducted in real time.

SUMMARY OF THE INVENTION

The object of the present invention is to smooth the flow of communications among network computer users conducting conversations in real time.

Toward solving the aforementioned problems, a first aspect of the invention in the present application presents a communication support method wherein a plurality of users mutually share the same network, used in a communication device that is simultaneous, bi-directional communication-enabled. The method provides (A) preparing a correlation between predetermined text information and the users;

(B) detecting the utterance of any of the text information by a first user on a network;

(C) in response to the text information detection, finding the status of a second user correlated with the detected text information; and (D) sending the detected second user status to the network on which the text information was uttered.

Taking a chat system comprising a chat server and a chat client as an example will illustrate: User A stores a keyword on the terminal of user A. If a keyword registered by user terminal A is uttered by another user terminal B on a channel #CH1 in which user terminal A is participating, the utterance of that keyword is detected by user terminal A. Next, user terminal A detects the status of user A. For example the fact that a screen saver is operating or that a text message is being composed on another channel is detected. Subsequently, notification is given of the detected status to user terminal B on the channel on which the keyword was uttered.

A second aspect of the invention in the present application presents a communication support system wherein identical networks are mutually shared, used in a communication device that is simultaneous bi-directional communication-enabled. The communication support system is provided with a first storage means, a detection means, a decision means and a reporting means.

The first storage means stores predetermined text information correlated with communication devices on a networks. The detection means detects the sending of any text information from a first communication device on a network. The decision means, in accordance with the detection of the text information, based on the status of a second communication device correlated with the detected text information judges the user status of the second communication device. The reporting means sends the user status to the network to which the text information was sent.

Taking a chat system comprising a chat server and a chat client as an example will illustrate: In any terminal, the first storage means correlates user keywords with users. If a keyword registered by user terminal A is uttered by another user terminal B on a channel #CH1 in which user terminal A is participating, that keyword is detected by the detection means in user terminal A.

Next, the decision means in user terminal A judges the status of user A based on the status of user terminal A. For example, the fact that a screen saver is operating or that a text message is being composed on another channel is detected, and the status of user A is thereby judged. Examples of user situations include "absent," "working," and "responding." Next, the decision means sends the judged user status to the reporting means. The reporting means uses a chat client and notifies the other user terminal of the status of user A on channel #CH1.

A decision means is provided in each user terminal. The first storage means, detection means and reporting means may be provided in each user terminal and, moreover, may be provided in any information terminal that can run the chat client.

A third aspect of the invention in the present application is the communication support system according to the second aspect of the invention, but further presents a second storage means that stores communication devices that report user status and text-information sending-source communication devices, correlated with the communication devices on the network. The communication support system reporting means determines user status report destinations in accordance with the second storage means, and reports the user status to the report destination via the network.

For example, the second storage means stores a report destination table, wherein are recorded, for instance, content such as the following. For user terminal A, the report destination is set to user terminal B if the keyword was sent from user terminal B, and the report destination is set to user terminals B, C if the keyword was sent from user terminal C. Likewise, the remark source of the keyword and the report destination of the user status are also set for other user terminals. If the user wants to give notification of the status of another communication device other than the communication device that sent the keyword, the user can specify the report destination using the report destination table.

A fourth aspect of the invention in the present application is the communication support system according to the second aspect of the invention, but further presents a third storage means that stores user schedules correlated with communication devices. The reporting means in this communication support system determines the user status to be sent to the network based on the judged user status of the second communication device and based on the schedule corresponding to the second communication device.

For example, the third storage means stores the previously described schedule list wherein user schedules are correlated with the users. If the status of user A is judged to be "absent," then the reporting means consults user A's schedule. If the user A's schedule is "Afternoon business trip to Tokyo," then the reporting means sets "Afternoon business trip to Tokyo" as the report content. By providing the schedule list beforehand and combining it with the detected user status, a much more detailed user-status notification can be given.

A fifth aspect of the invention in the present application is the communication support system according to the second aspect of the invention, but further presents an acquisition means that detects whether the second communication device is operating, and acquires the user status from the decision means in accordance with the detection results.

Consider a system configuration comprising a plurality of user terminals and at least one proxy terminal. Each user terminal is provided with a status reporting means. The proxy terminal is provided with a first storage means, a detection means, an acquisition means and a reporting means. If the detection means detects a user A keyword, the acquisition means judges whether user terminal A is running. If it is running, the acquisition means makes a request to user terminal A to determine the user status, and then receives notification of the user status from user terminal A. The received user status is sent to the reporting means. Conversely, if user terminal A is not running, the acquisition means notifies the reporting means to that effect. By providing the acquisition means, the user status can be reported even if the user terminal is not running.

A sixth aspect of the invention in the present application is the communication support system according to the second invention, but further presents a display means that visually displays the status of each user sharing the network, and that can change the display in accordance with the user status sent from the network.

For example, icons are prepared beforehand that indicate each of the following situations "absent," "busy," and "responding." Then, if notification of a user status is given by another communication device, the display means changes the icon of that user to an icon that indicates the reported status.

A seventh aspect of the invention in the present application presents a status notification device used together with a communication device that is simultaneous, bi-directional communication-enabled wherein a plurality of users mutually share the same network. The status notification device is provided with a first storage means, a detection means, a decision means and a reporting means.

The first storage means stores predetermined text information. The detection means detects the sending of the text information from another communication device on a network. The decision means, in accordance with the detection of the text information, judges user status based on the status of the communication device. The reporting means sends the user status to the network to which the text information was sent.

Actions/effects here are likewise as with the communication device in the second aspect of the invention wherein constituted without using a proxy terminal.

An eighth aspect of the invention in the present application presents a proxy device used in communication device that is simultaneous, bi-directional communication-enabled wherein a plurality of users mutually share the same network. The proxy device is provided with a first storage means, a detection means, an acquisition means and a reporting means.

The first storage means stores predetermined text information correlated with users. The detection means detects the sending of any text information from a first communication device on a network. The acquisition means, in accordance with the detection of the text information, detects whether a second communication device correlated with the detected text information is operating, and acquires from the second communication device the user status of the second communication device in accordance with the detection results. The reporting means sends, to the network to which the text information was sent, the user status based on the detection results, or the acquired user status.

Actions/effects here are likewise as with a proxy terminal in the second aspect of the invention, wherein each user terminal is provided with a judgement means and the proxy terminal bears other functions.

A ninth aspect of the invention in the present application presents a computer readable recording medium on which is recorded a status notification program used together with a communication device that is simultaneous, bi-directional communication-enabled wherein a plurality of users mutually share the same network. The status notification program is recorded for executing steps A to D below.

(A) a step of storing predetermined text information;

(B) a step of detecting the sending of the text information from another communication device on a network;

(C) a step of judging, in accordance with the detection of the text information, user status based on the status of the communication device; and (D) a step of sending the user status to the network to which the text information was sent.

Actions/effects here are likewise as with the seventh aspect of the invention.

A tenth aspect of the invention in the present application provides a computer readable recording medium on which is recorded a proxy notification program wherein a plurality of users mutually share the same network, used in a communication device that is simultaneous, bi-directional communication-enabled. The proxy notification program is recorded for executing steps A to D below.

(A) a step of storing predetermined text information correlated with users;

(B) a step of detecting the sending of any text information from a first communication device on a network;

(C) a step of finding, in response to the text information detection, whether the second communication device correlated with the detected text information is operating, and acquiring the second communication device user status from the second communication device in accordance with the detection results, and (D) a step of sending the user status based on the detection results, or the acquired user status, to the network to which the text information was sent.

Actions/effects here are likewise as with the eighth aspect of the invention.

Utilizing the present invention enables communications to flow smoothly since users engaged in real-time conversation using text messages can determine each other's situations in real time as needed.

The foregoing and other objects, features, aspects and advantages of the present invention will become more apparent from the following detailed description in conjunction with the accompanying drawings.

BRIEF DESCRIPTION OF THE DRAWINGS

FIG. 3 is an explanatory diagram illustrating a keyword list example;

FIG. 4 is an explanatory diagram illustrating a report destination table example;

FIG. 16 is an explanatory diagram illustrating one example of information in a keyword DB;

FIG. 17 is an explanatory diagram illustrating one example of information in a report destination DB.

DETAILED DESCRIPTION OF THE PREFERRED EMBODIMENTS

The following sets forth embodiments to explain the communication support system of the present invention specifically.

First Embodiment

Configuration

Figure 1:
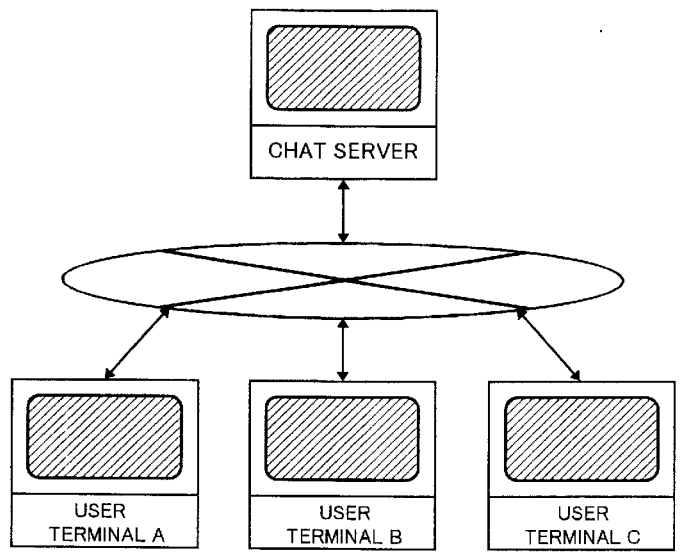
FIG. 1 is a diagram of the overall configuration of a communication support system according to the first embodiment.

FIG. 1 is a diagram illustrating the entire configuration of the communication support system according to the first embodiment. In the communication support system of the present embodiment, a chat server and a plurality of user terminals are connected via a computer network.

Figure 2:
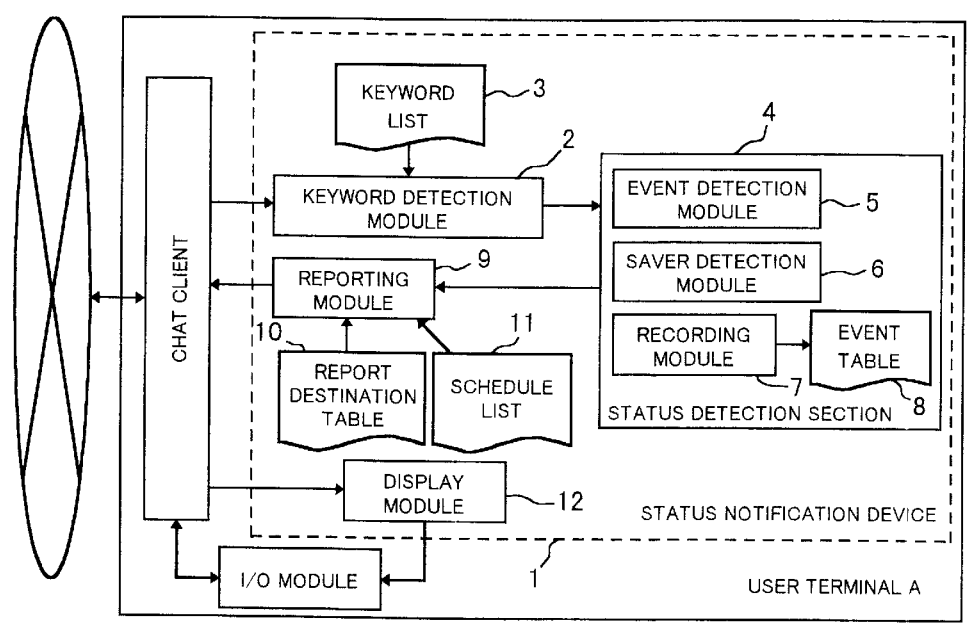
FIG. 2 is a block diagram illustrating the configuration of a user terminal in the first embodiment.

FIG. 2 is a block diagram illustrating the configuration of the user terminal of the present embodiment. The user terminal shown in FIG. 2 is provided with a chat client and status notification device 1. Status notification device 1 is provided with a keyword-detection module 2, a keyword list 3, a status-detection section 4, a reporting module 9, a report destination table 10, a schedule list 11 and a display module 12.

The keyword-detection module 2 acquires from the chat client the remarks in the channel in which the chat client is participating. The keyword-detection module 2 judges whether the acquired remark is sent from another user terminal or inputted by the local terminal. If it is a remark from another user terminal, the keyword-detection module 2 judges whether a keyword registered by the user is included in the acquired remark. This decision is made based on the keyword list 3, which is discussed later. If a keyword is included in the remark, the keyword-detection module 2 instructs the status-detection section 4 to detect the user status. This instruction is executed by the keyword-detection module 2 notifying the status-detection section 4 of the name of the channel on which the keyword was uttered, and the nickname of the user that uttered the keyword.

FIG. 3 is a diagram illustrating an example of a keyword list 3 registered by a user. Presumably, users normally register their real names and nicknames. In addition, it is also assumed that a user will register an "all," which is a keyword common to all users on the channel. In FIG. 3, user "Tamie Tanaka" has registered her real names "Tanaka" and "Tamie" as well as her nickname "tana" and "all" as keywords. The keyword list 3 can be registered by the user or may be automatically created. For example, it is possible to register automatically the user's real name, nickname and "all" as keywords, and for other keywords to be additionally registered by the user.

The status-detection section 4 judges user status in accordance with an instruction from the keyword-detection module 2. This is in order that the real-time status of user terminal B is reported when user terminal A calls user terminal B. In the present embodiment, the status-detection section 4 judges whether the user status is either "absent," "working" or "responding." When the status-detection section 4 has judged the user status, it notifies the reporting module 9 of the user status. In addition, along with the user status, the status-detection section 4 notifies the reporting module 9 of the name of the channel on which the keyword was uttered and the nickname of the user that uttered the keyword.

The status-detection section 4 has an event-detection module 5, a screen saver detection module 6 and a recording module 7 for judging user status. The event-detection module 5 detects the presence of user input (hereinafter referred to as an event), such as whether there is any keyboard input or whether the mouse is moving. In addition, the event-detection module 5 detects whether the user input is directed to a channel on chat or whether it is input in an application other than chat. The screen saver detection module 6 detects whether the user terminal screen saver is operating. The recording module 7 creates an event table 8 and records in the event table 8 events that occur within a predetermined time, along with the time of the events.

The reporting module 9 notifies the other user terminals, via the chat client, of the user status reported by the status-detection section 4. The report destination user terminals are determined based on the report destination table 10. FIG. 4 shows an example of a report destination table 10. The nickname of the user that uttered the keyword is registered in the report destination table 10 as the call source user. The report destination user(s) who are notified of self-status for keyword utterances from a call source user are correlated with each call source and registered. It is possible to specify that notification be given of the self-status only to the call source, or that notification be given to all users on the channel. In addition, a plurality of users can also be specified as the report destination. In FIG. 4, for example, user A specifies "oku" as the report destination if the call source user is "oku." If the call source user is "sasa," then "sasa" and "tana" are specified as report destinations. If the call source user is "yama," then all users ("all") are specified as report destinations. The report destination table 10 is prepared in advance by any means, such as registering by a user.

In addition, based on the user status reported by the status-detection section 4, the reporting module 9 determines which text message among text messages prepared in advance is to be reported. Next, the reporting module 9 issues the text message on the call source channel. The status of the called user is thereby reported to the report destination user. The reporting module 9 may also give notification to the report destination of a text message or, in place of a text message, information indicating the user status (hereinafter referred to as the status information). Notification of the status information is given via the chat client. The report destination user terminal that receives this status information displays an icon indicating the user status, for example. The status information may be a text message or may be other information such as a control command.

If the schedule list 11 is prepared in advance, the reporting module 9 determines the text message based on the user status reported by the status-detection section 4 and based on a pre-registered schedule list 11 (not shown). The user registers the user's schedule status in the schedule list 11. The user registers plans, such as "at work," "business trip," "meeting" and "yearly vacation," correlated with date, time and destination.

For example, when the reporting module 9 receives notification of an "absent" user status from the status-detection section 4, it consults the schedule list 11. In the schedule list 11, "business trip" is registered as the schedule for that time and "Tokyo" is registered as the destination. Thereupon, the reporting module 9 sets "Business trip Tokyo" as the text message to be reported. Conversely, if the schedule in schedule list 11 is "at work," the reporting module 9 sets "Presently away from desk" as the text message to be reported. However, if the user status is "responding" or "working," the reporting module 9 does not consult the schedule list 11. Instead, it creates a text message that indicates the user status, such as "Responding" or "Presently busy," which it reports to the report destination. If the schedule list 11 is provided in advance, detailed user status can be reported; however, even if the schedule list 11 is not provided or even if the schedule is not registered in the schedule list 11, user status can still be reported.

The display module 12 displays a window on the screen for each channel in which the chat client is participating. Furthermore, the display module 12 displays, in these windows, icons that indicate the status of each user participating in the channel. FIG. 5 to FIG. 8 are examples of screen shots wherein icons indicating user situations are displayed by the display module 12. The display module 12 displays an icon for each user on the channel, and the status of each user participating on the channel is visually indicated. Icons are prepared in advance in accordance with predetermined status information. The display module 12 changes the icon to be displayed based on the status information for other user terminals, sent from the reporting module 9. For example, if a text message corresponding to "away from desk" is sent from another user terminal as the status information, the display module 12 changes the icon that indicates the status of that user to an "away-from-desk" icon.

FIG. 5 to FIG. 8 are examples of screen shots wherein the display module 12 of the report destination displays text messages and icons reported by the reporting module 9 at the call source. Text messages and icons are prepared in advance in accordance with the user status to be reported. In the present embodiment, text messages that report "absent," "working" and "responding" situations are prepared in advance. In addition, icons that indicate "at desk," "away from desk" and "working" are prepared.

Figure 5A:
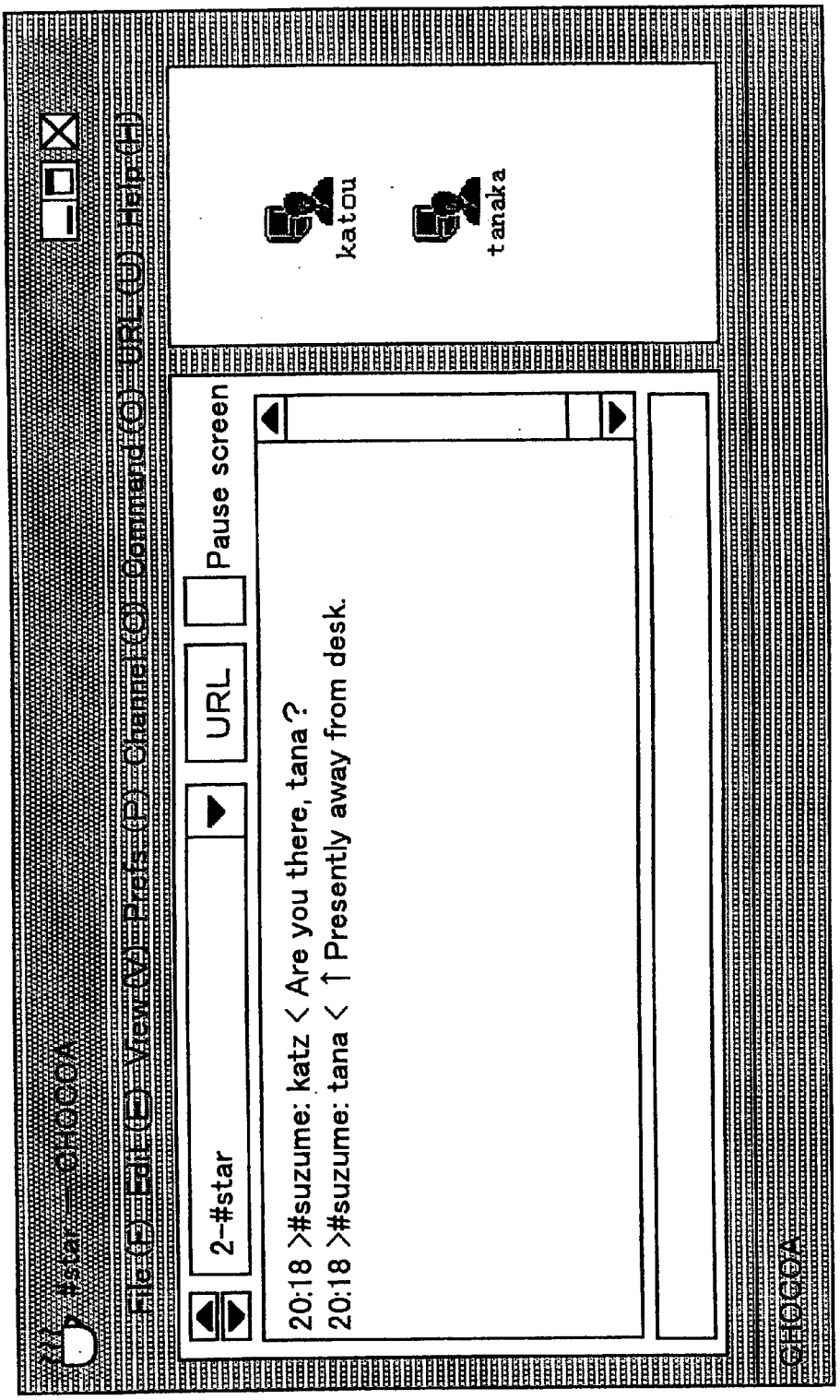
FIG. 5(a) is an explanatory diagram illustrating an example of displaying "away from desk" status by a text message.
Figure 5B:
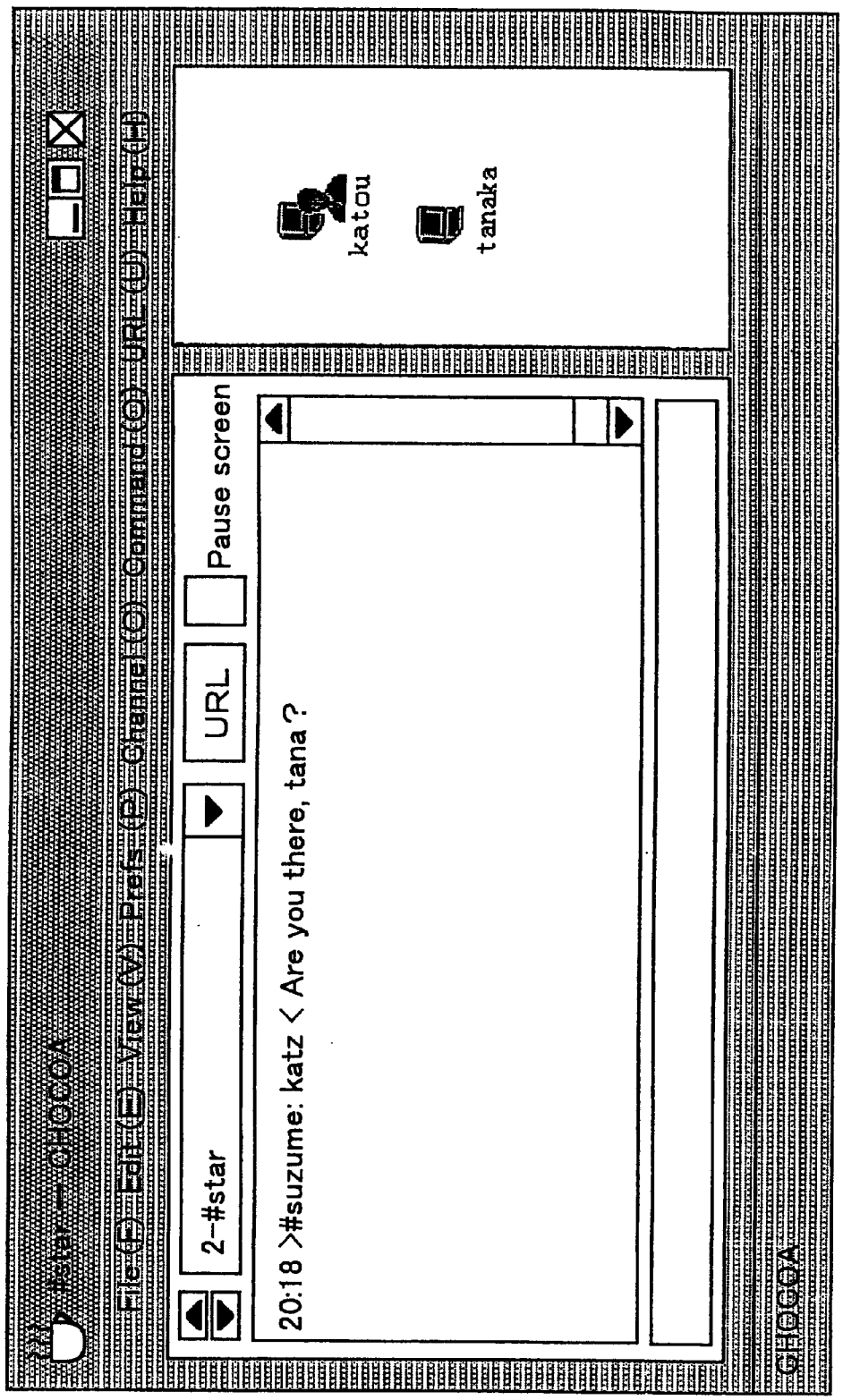
FIG. 5(b) is an explanatory diagram illustrating an example of displaying "away from desk" status by an icon.

FIG. 5(a) is an example of a screen shot wherein the text message reported by the reporting module 9 is displayed. On channel "#suzume," user "katz" has uttered the real name of user "tana," and a text message to the effect that user "tana" is not at her desk is displayed. In addition, the display module 12 may also display user status as an icon, as shown in FIG. 5(b). Therein the display module 12 displays the status of user "tana" by an icon indicating a "not-at-desk" status.

Figure 6A:
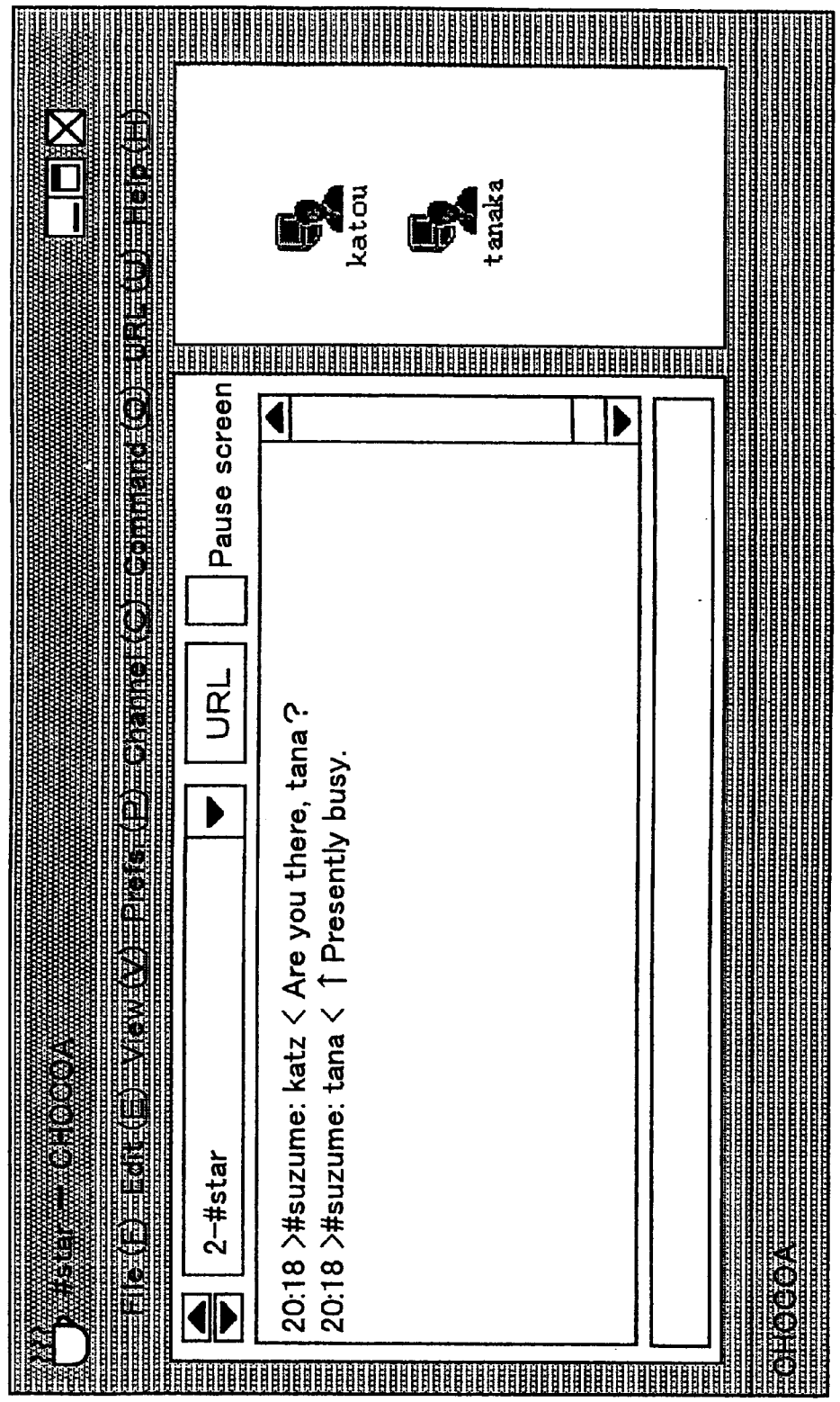
FIG. 6(a) is an explanatory diagram illustrating an example of displaying "busy" status by a text message.
Figure 6B:
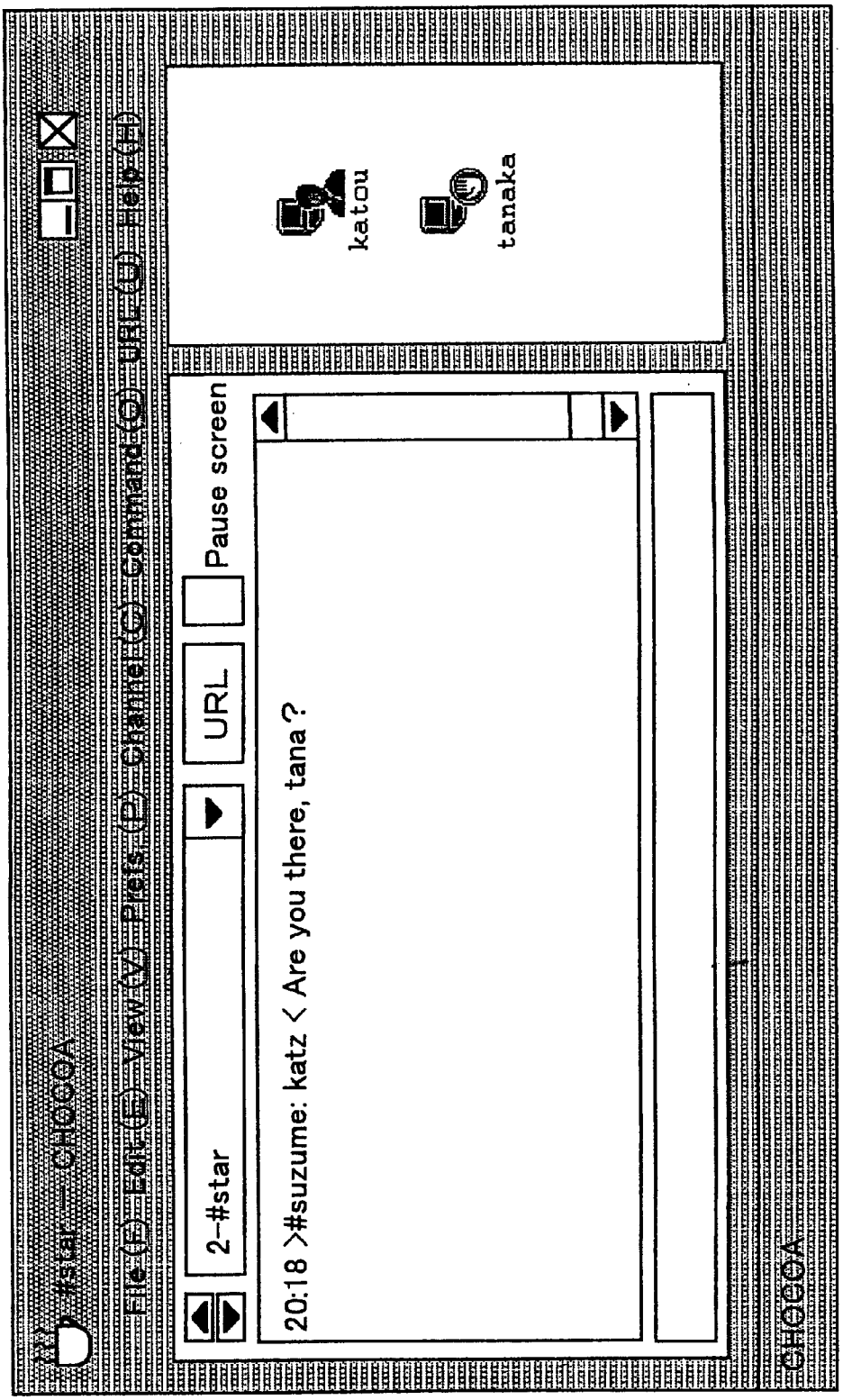
FIG. 6(b) is an explanatory diagram illustrating an example of displaying "busy" status by an icon.

FIG. 6 is another example of a screen shot wherein a text message is displayed. FIG. 6(a) is a display example of a text message indicating that user "tana" is operating another application or is inputting remarks on another channel. In addition, FIG. 6(b) shows a screen shot taken after the display module 12 has changed the icon display of user "tana" in accordance with notification given by user "katz"'s user terminal.

Figure 7:
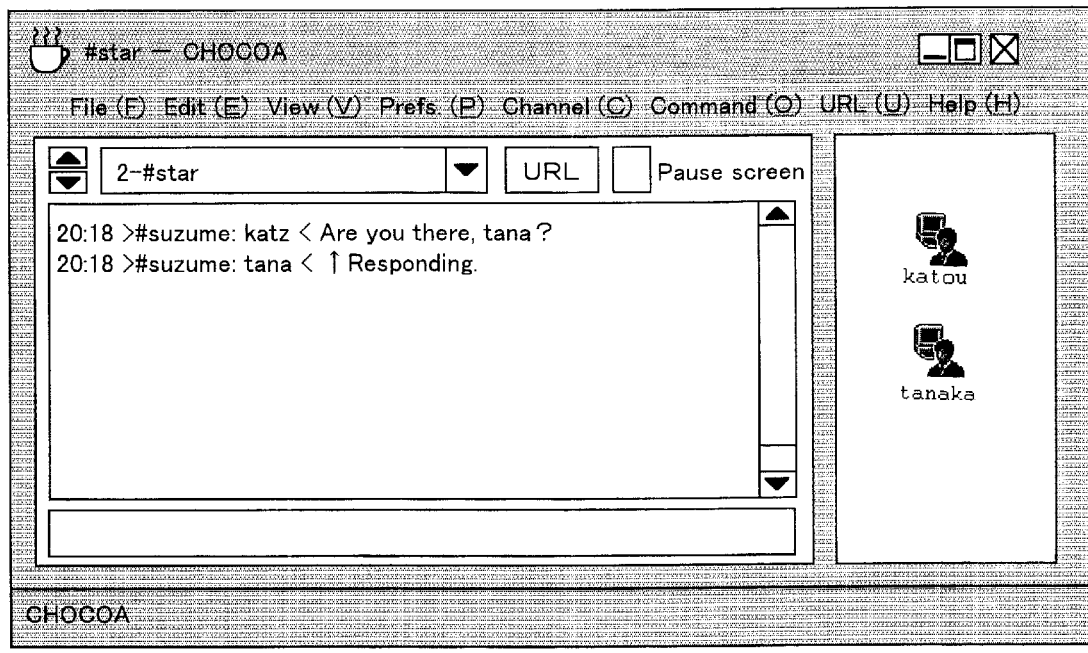
FIG. 7 is an explanatory diagram illustrating an example of displaying "responding" status by a text message.

FIG. 7 is another example of a screen shot wherein a text message is displayed. The screen of FIG. 7 is a display example of a text message indicating that user "tana" is inputting a reply to user "katz."

Figure 8:
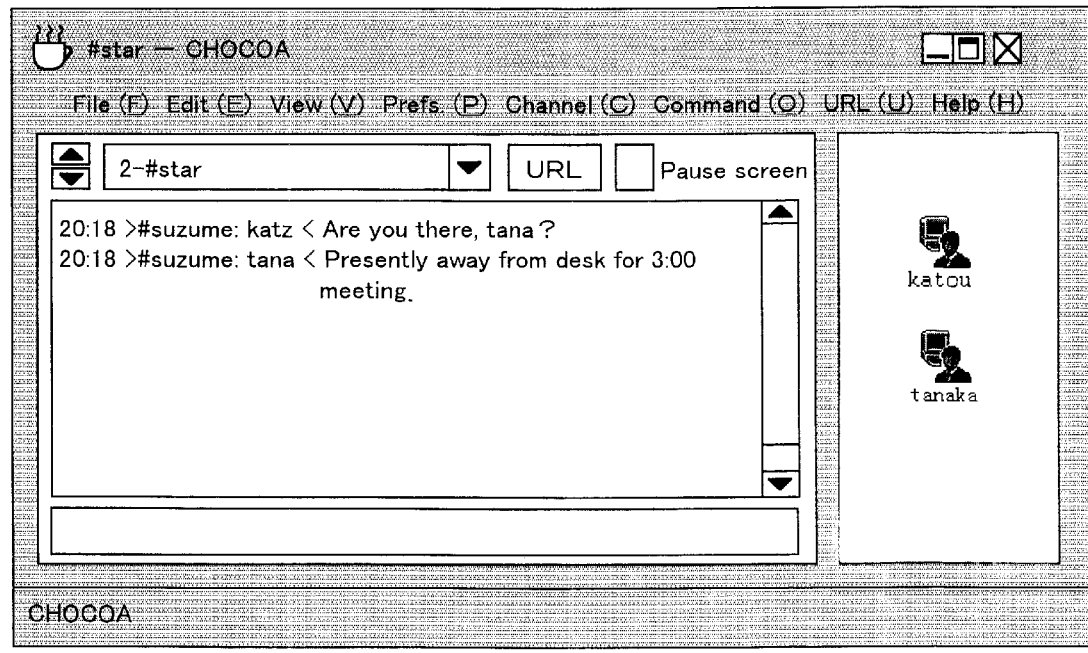
FIG. 8 is an explanatory diagram illustrating an example of displaying a text message combined with a schedule.

FIG. 8 is another example of a screen shot wherein a text message is displayed. The screen of FIG. 8 is a display example wherein the reporting module 9 has determined a text message based on both the user status and the schedule list 11.

FIG. 5 to FIG. 8 show examples of reporting user status by reporting a text message or by changing the display of an icon. Of course, it is also possible to do both, i.e., report a text message and change the icon display.

Process Flow

The following explains the process flow executed by the status notification device 1 according to the present embodiment.

(1) Main Routine

Figure 9:
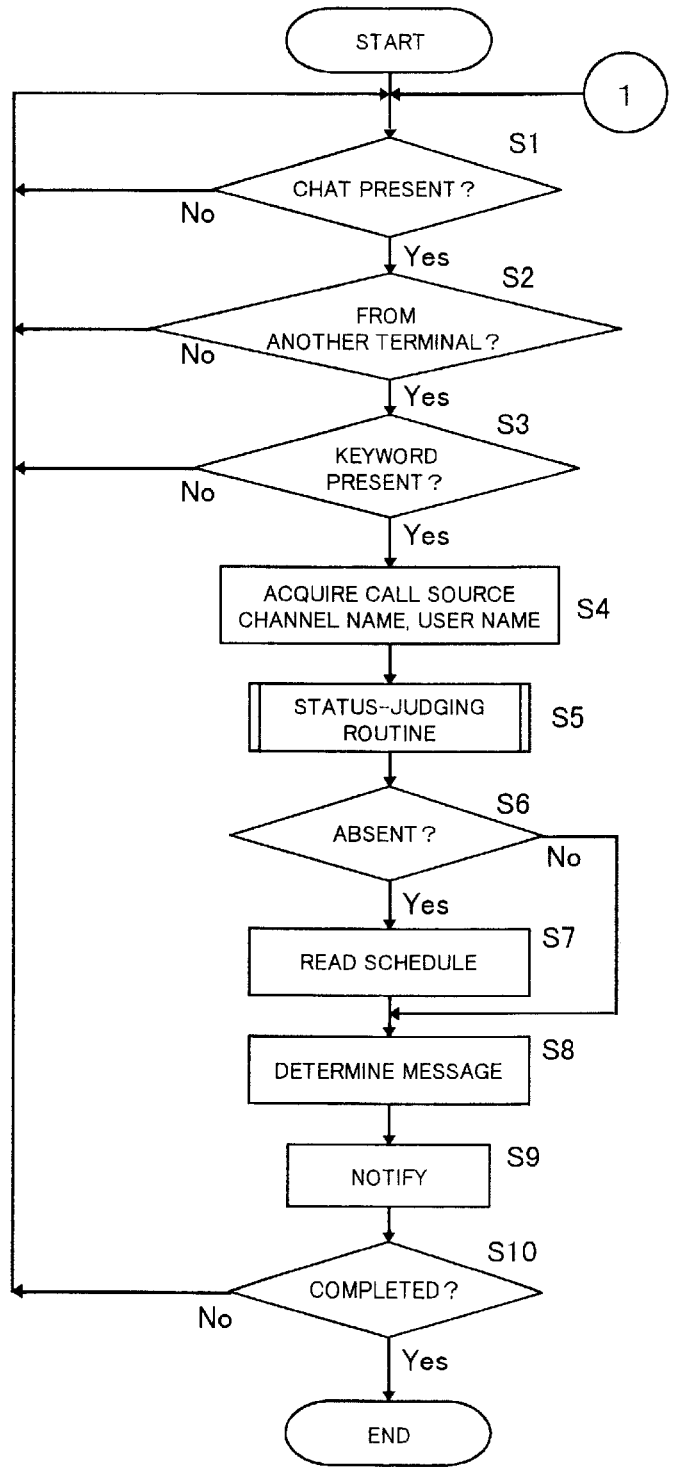
FIG. 9 is a flowchart illustrating process flow of a main routine executed by the status notification device in the first embodiment.

FIG. 9 is a flowchart illustrating the process flow of a main routing executed by the status notification device 1. Loading a chat client on a user terminal, or running a chat client to connect a user terminal and a chat server, starts the following routine.

First, in step S1, the keyword-detection module 2 stands by for a remark on the channel in which the chat client is participating; if a remark occurs, the process flow goes to step S2.

In step S2, the keyword-detection module 2 judges whether the acquired remark was inputted by the local terminal or was sent from another user terminal. If the remark is from another user terminal, the process flow goes to step S3. If the remark is from the local terminal, the process flow returns to step S1 and the keyword-detection module 2 stands by for the next remark.

In step S3, the keyword-detection module 2 judges whether the remark from another user terminal includes any keyword in the keyword list 3. If a keyword is included in the remark, the process flow goes to step S4. If a keyword is not included in the remark from another user terminal, the process flow returns to step S1 and the keyword-detection module 2 stands by for the next remark.

In step S4, the keyword-detection module 2 acquires the name of the channel (hereinafter referred to as the call source channel) on which the keyword was uttered, and the nickname of the user (hereinafter referred to as the call source user) that uttered the keyword. Next, the keyword-detection module 2 reports the acquired channel name and nickname, and instructs the status-detection section 4 to judge the user status.

In step S5, a status-judging routine, discussed later, is executed.

In step S6, the reporting module 9 receives notification of the user status from the status-detection section 4. The reporting module 9 judges whether the reported user status is "absent." If the user status is "absent," the process flow goes to step S7. If not "absent," the process flow goes to step S8, discussed later.

In step S7, the reporting module 9 reads the schedule list 11.

In step S8, the text message to be reported is determined based on the user status an d user schedule.

In step S9, the reporting module 9 searches report destination table 10 for the nickname of the call source user, and determines the user to be notified. Next, the reporting module 9 reports the text message and status information to the determined report destination user terminal. At the user terminal that received the text message and status information, the display module 12 displays the reported text message and changes the icon based on the status information.

Step S10 judges whether the chat client program is finished. If the chat client program is finished, the routine ends. If the chat client program is not finished, the process flow returns to step S1 and the above-described routine is repeated.

When called by another user by a keyword, the present routine detects user status in real time, which it reports. The present routine can thereby notify a user, when the user so requests, of the status of another user, and can therefore support the smooth flow of conversations conducted in real time.

(2) Judge Status Subroutine

Figure 10:
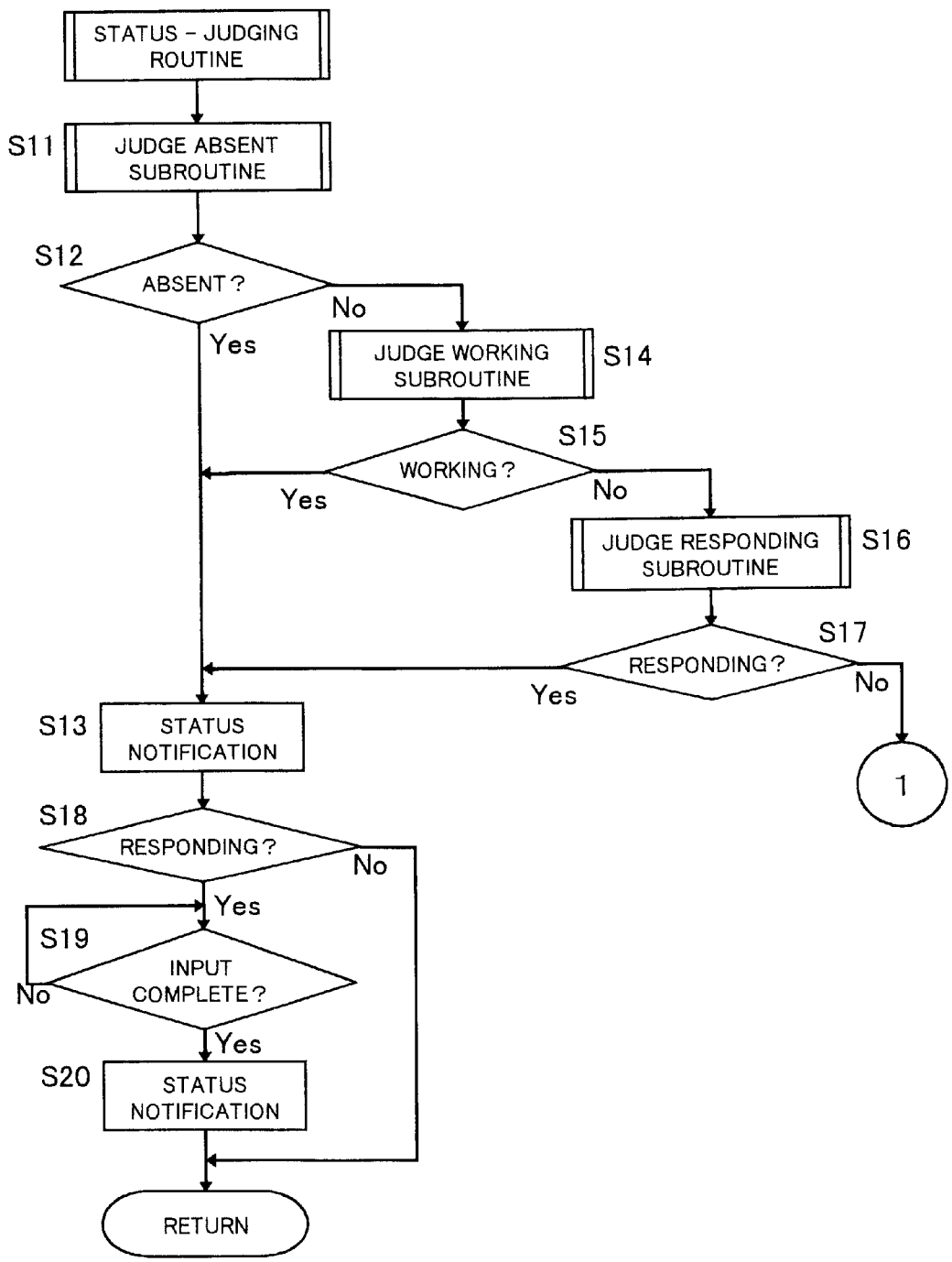
FIG. 10 is a flowchart illustrating process flow in a status-judging routine.

When the main the process flow goes to step S5, the following judge status routine is executed. FIG. 10 is a flowchart illustrating the flow of the status-judging routine executed by the status-detection section 4.

In step S11, the status-detection section 4 executes a judge absent subroutine, discussed later, and determines whether the user status is "absent."

In step S12, the status-detection section 4 judges whether the user status determined by the aforementioned judge absent subroutine is "absent." if the user status is "absent," the process flow goes to step S13. If the user status is not "absent," the process flow goes to step S14, discussed later.

In step S13, the status-detection section 4 reports the "absent" user status to the reporting module 9. Moreover, together with the user status report, the status-detection section 4 reports the call source channel and the nickname of the call source user to the reporting module 9.

If the user status is judged not to be "absent" in step S12, the process flow goes to step S14. In step S14, the status-detection section 4 executes a judge working subroutine, discussed later, and determines whether the user status is "working."

In step S15, the status-detection section 4 judges whether the user status determined by the aforementioned judge working subroutine is "working." If the user status is "working," the process flow goes to step S13. Furthermore, together with the "working" user status, the status-detection section 4 reports the call source channel and the nickname of the call source user to the reporting module 9. If the user status is not "working," the process flow goes to step S16.

In step S16, the status-detection section 4 executes a judge responding subroutine, discussed later, and determines whether the user status is "responding."

In step S17, the status-detection section 4 judges whether the user status determined by the judge responding subroutine is "responding." If the status-detection section 4 judges that the user status is "responding," the process flow goes to step S13. Furthermore, the status-detection section 4 reports the "responding" user status to the reporting module 9. If the user status is not "responding," then the process flow returns to step S1 of the main routine, and the keyword-detection module 2 stands by for the next remark.

If any of the user situations "absent," "working" or "responding" is reported to the reporting module 9 in step S13, the process flow goes to step S18. In step S18, the status-detection section 4 judges whether the user status is "responding." If the user status is "responding," the process flow goes to step S19. If the user status is otherwise, the process flow returns to the main routine, since user status notification has already been completed.

In step S19, the status-detection section 4 judges whether the user currently inputting a response to a remark has finished inputting. Specifically, the status-detection section 4 judges whether inputting has finished by judging whether the return key has been pressed at the end of the inputted response message. If the judgment is that inputting has finished, the process flow goes to step S20.

In step S20, the status-detection section 4 notifies the reporting module 9 that inputting has finished. The reporting module 9 notifies the report destination user terminal that inputting has finished. The user terminal that receives that notification executes such processes as changing icon displays. Then, the process flow returns to the main routine.

(3) Judge Absent Subroutine

Figure 11:
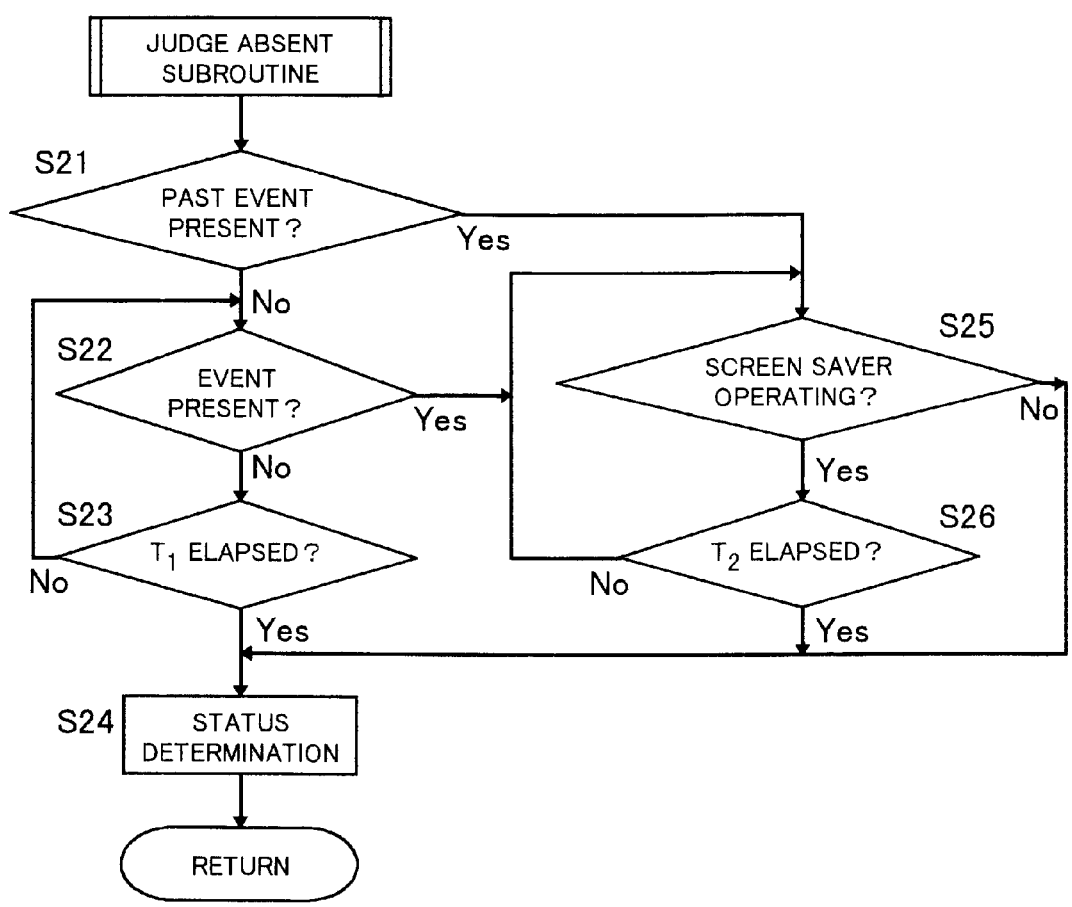
FIG. 11 is a flowchart illustrating process flow in a judge absent subroutine.

FIG. 11 is a flowchart illustrating the flow of the judge absent subroutine executed by the status-detection section 4. If the process flow goes to step S11 in the status decision routine, then the following processing is started.

In step S21, the status-detection section 4 judges, based on an event log, whether there was an event before the keyword utterance. Specifically, the status-detection section 4 judges whether there was an event, such as keyboard input or mouse operation, during a past fixed time prior to the keyword utterance. If the status-detection section 4 judges that there was an event in that past predetermined time, the process flow goes to step S25, discussed later. If it is judged that there was no event, the process flow goes to step S22.

In step S22, the status-detection section 4 judges whether an event is currently in progress. If a user event is not in progress, the process flow goes to step S23. If a user event is in progress, the process flow goes to step S25.

In step S23, the status-detection section 4 judges whether predetermined time Ti has elapsed since the keyword was uttered. If predetermined time Ti has not elapsed, the process flow returns to step S22, and the decision is re-executed. In other words, step S22 and step S23 judge whether an event occurs within predetermined time T1 after the keyword was uttered. If it is judged in step S23 that predetermined time T1 has elapsed, the process flow goes to step S24.

In step S24, the status-detection section 4 determines whether the user status is "absent." If an event does not occur in a predetermined elapsed time prior to the keyword utterance, nor occurs also in predetermined time T1 after the keyword utterance, then the user status is determined to be "absent."

If it is judged in step S21 that a user event occurred in the predetermined elapsed time prior to the keyword utterance, the process flow goes to step S25. In step S25, the status-detection section 4 judges whether a screen saver is operating on the user terminal. If a screen saver is operating on the user terminal, the process flow goes to step S26. If a screen saver is not operating, the process flow goes to step S24. Then, since the screen saver is not operating and the user is performing some operation on the user terminal, it is determined that the user status is not "absent."

In step S26, the status-detection section 4 judges whether predetermined time T2 has elapsed since the keyword utterance. If predetermined time T2 has not elapsed, the process flow returns to step S25, and the decision is re-executed. If predetermined time T2 has elapsed, the process flow goes to step S24. In this case, since the screen saver was operating from the time when the keyword was uttered until predetermined time T2 elapsed, and since the user was not performing any operation on the user terminal during that interval, the user status is determined to be "absent."

(4) Judge Working Subroutine

Figure 12:
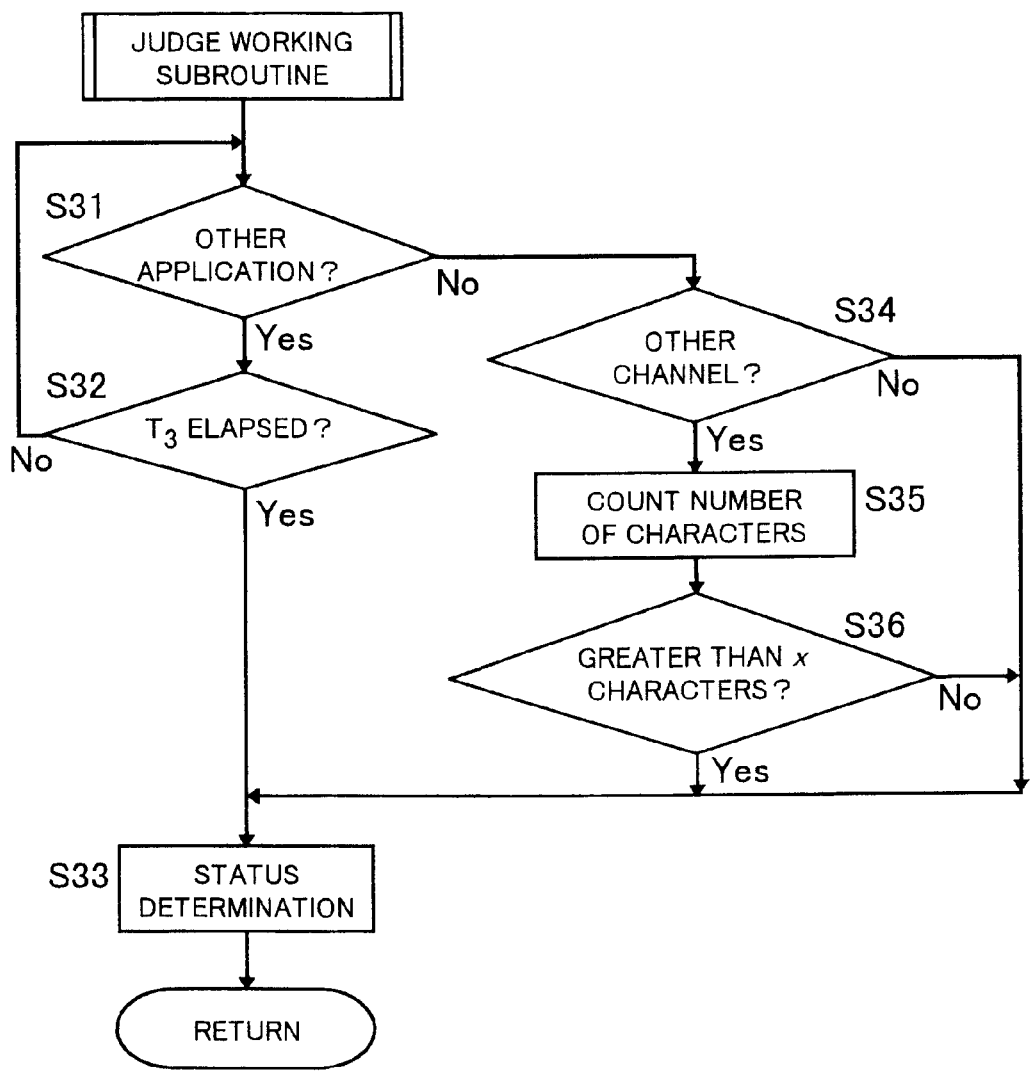
FIG. 12 is a flowchart illustrating process flow in a judge working subroutine.

FIG. 12 is a flowchart illustrating the flow of a judge working subroutine executed by the status-detection section 4. If the process flow goes to step S14 in the judge status routine, the following subroutine is initiated.

In step S31, the status-detection section 4 judges whether the user is running an application other than the chat client. This decision is executed by judging whether, for example, there is mouse operation at the user terminal directed to another application. If it is judged that the user is operating another application, the process flow goes to step S32. If the decision is that the user is not running another application, the process flow goes to step S34, discussed later.

In step S32, the status-detection section 4 judges whether predetermined time T3 has elapsed since the keyword utterance. If predetermined time T3 has not elapsed, the process flow returns to step S31, and the decision is re-executed. In other words, the decision is whether an operation directed to another application is being performed continuously during predetermined time T3 after the keyword utterance. If it is judged that predetermined time T3 has elapsed since the keyword utterance, the process flow goes to step S33.

In step S33, the status-detection section 4 determines whether the user status is "working." If the user is running another application and predetermined time T3 has elapsed since the keyword utterance, the user status is judged to be "working."

If it is judged in step S31 that the user is not running another application, the process flow goes to step S34. In step S34, the status-detection section 4 judges whether the user is inputting a text message on another channel different from the call source channel. If the decision is that a remark is being input on another channel, the process flow goes to step S35. If the decision is that a remark is not being input on another channel, the process flow goes to step S33. In this case, the user is not running another application and nor inputting a remark on another channel. Accordingly, in step S33, the user status is determined not to be "working."

In step S35, the status-detection section 4 acquires a text message input by the user on another channel, and counts the number of characters.

In step S36, the status-detection section 4 judges whether the input character count is greater than or equal to a predetermined standard character count. Next, the process flow goes to step S33, and the user status is determined. Namely, if the input character count is greater than or equal to the predetermined standard character count, the input message is long and, therefore, the user status is judged to be "working." Conversely, if the input character count is less than the predetermined standard character count, and the input message is short, the user status is determined not to be "working."

(5) Judge Responding Subroutine

Figure 13:
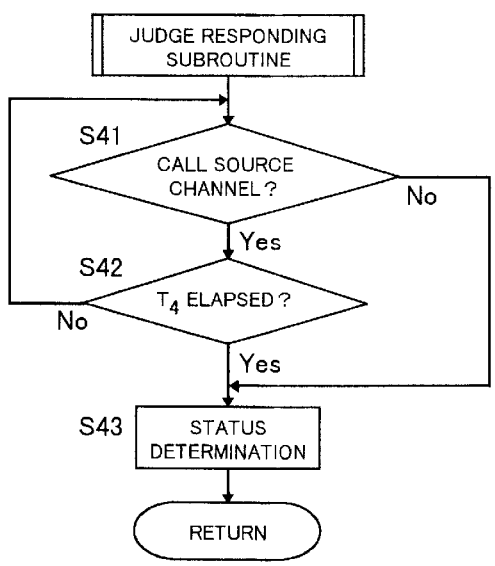
FIG. 13 is a flowchart illustrating process flow in a judge responding subroutine.

FIG. 13 is a flowchart illustrating the flow of a judge responding subroutine executed by the status-detection section 4. If the process flow goes to step S16 in the judge status routine, the following subroutine is executed.

In step S41, the status-detection section 4 judges whether a user on the call source channel is inputting a remark. If it is judged that the user is inputting on the call source channel, the process flow goes to step S42. If it is judged that the user is not inputting on the call source channel, the process flow goes to step S43, discussed later.

In step S42, the status-detection section 4 judges whether predetermined time T4 has elapsed since the keyword utterance. If predetermined time T4 has not elapsed, the process flow returns to step S41, and the subroutine is re-executed. If predetermined time T4 has elapsed since the keyword utterance, the process flow goes to step S43. In other words, step S41 and step S42 judge whether the user is trying to respond to a keyword utterance and the response is taking time. Although the decision in this example is performed based on the inputting time, the decision may also be based on the input text message character count as discussed earlier—the standard for making the decision is not especially limited.

In step S43, the status-detection section 4 determines whether the user status is responding to a keyword utterance. In the present subroutine, the user status is determined to be "responding" if a text message is being input on the call source channel from the time when the keyword was uttered until predetermined time T4 elapses. Subsequently, the process flow returns to the judge status subroutine. If it is judged in step S41 that a text message is being input on the call source channel, then the user status is judged to be "other," and the process flow returns to step S1 in the main routine.

Second Embodiment

Configuration

Figure 14:
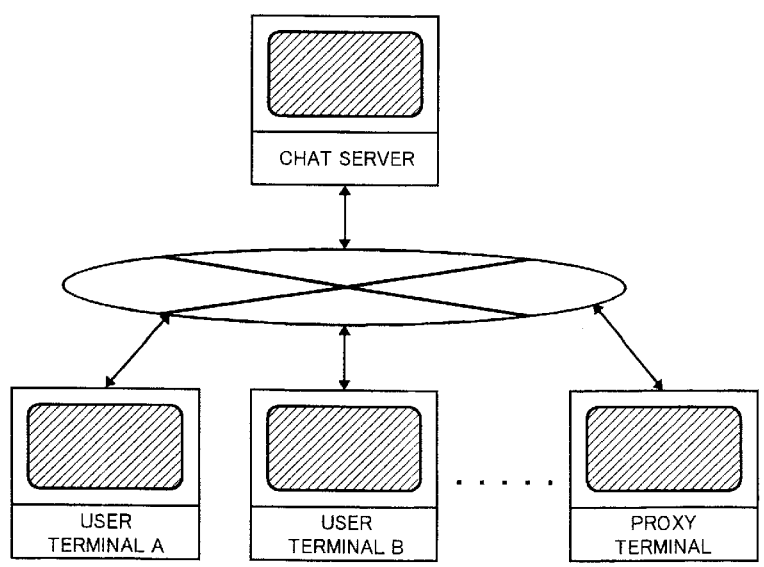
FIG. 14 is a diagram of the overall configuration of a communication support system according to the second embodiment.

The following explains the communication support system in accordance with a second embodiment of the present invention. FIG. 14 shows the overall configuration of the communication support system the present invention in the second embodiment. Connecting a chat server, a plurality of user terminals and a proxy terminal via a computer network constitutes the communication support system in this embodiment.

Figure 15:
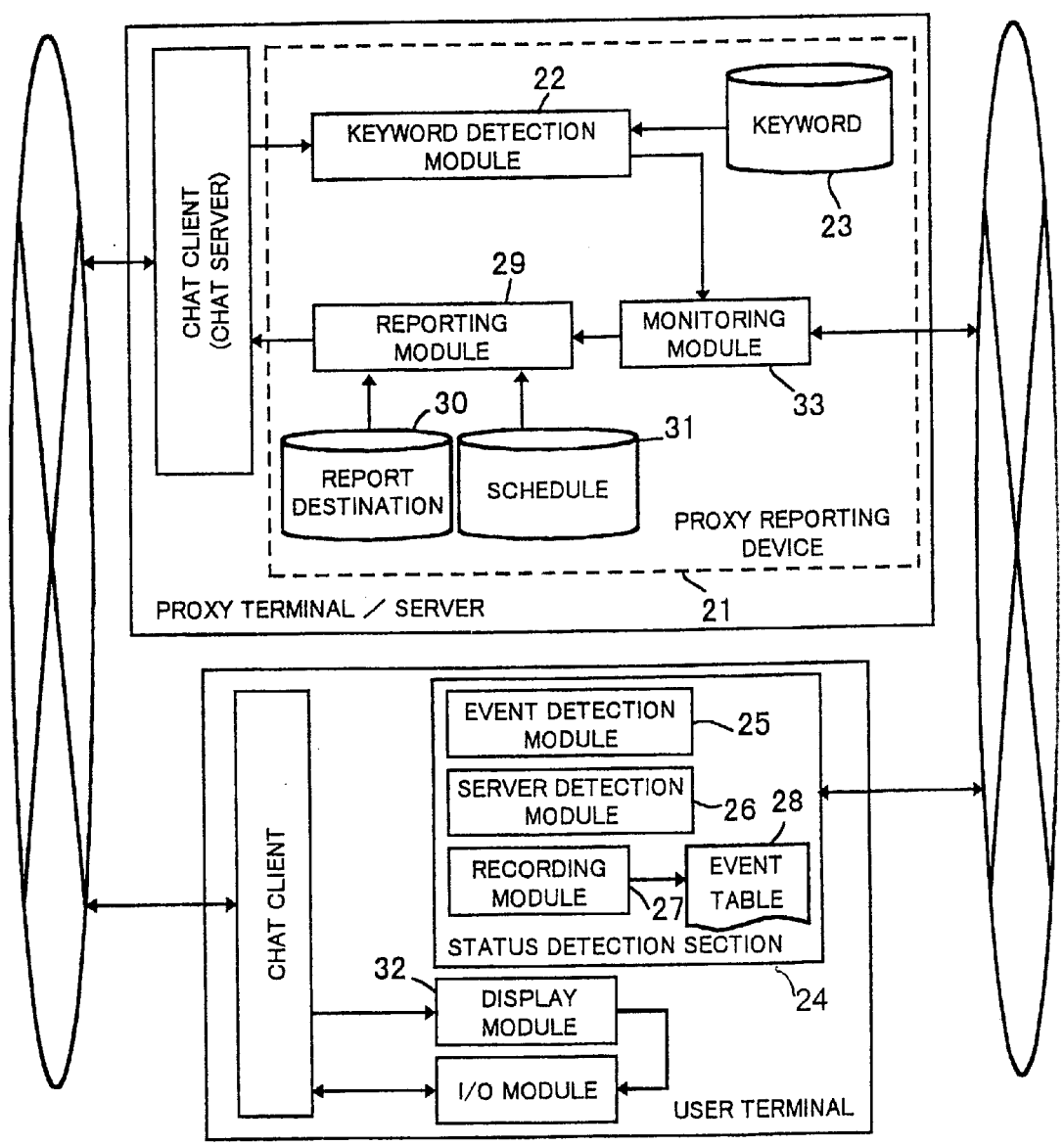
FIG. 15 is a block diagram illustrating the configuration of a proxy terminal and user terminal in the second embodiment.

FIG. 15 is a block diagram illustrating the configuration of the proxy terminal and user terminal of the present embodiment. The proxy terminal and user terminal are both provided with a chat client. The proxy terminal further has a proxy reporting device 21. The user terminal further has a status-detection section 24 and a display module 32.

(1) Proxy Terminal

The proxy reporting device 21 has a keyword-detection module 22, a keyword database (DB) 23, a monitor module 33, a reporting module 29, a report destination DB 30 and a schedule DB 31.

The keyword-detection module 22 detects keywords from remarks on a channel, in the same manner as in the keyword-detection module 22 on the user terminal in the first embodiment. However, in the proxy terminal, the keyword-detection module 22 judges whether there has been utterance with regard to keywords of all users participating on the call source channel. In addition, if the keyword-detection module 22 detects a keyword registered by any user, it judges whether the call source user is not the same as the user called by the keyword. If not the same, the keyword-detection module 22 reports predetermined information to the monitor module 33, and requests the detection of the status of the called user. In addition to the call source channel name and the nickname of the call source user, the predetermined information also includes the nickname of the called user.

FIG. 16 shows an example of a keyword DB 23 used by the keyword-detection module 22 for detecting keywords. The nickname of the user connected to the proxy terminal via the network and the word registered as a keyword by that user are correlated and stored in keyword DB 23 shown in FIG. 16. For example, the user whose nickname is "tana" registers her real name "Tanaka" and "Tamie," her nickname "tana" and "all" in keyword DB 23. If nickname "katz" utters "Tanaka," the keyword-detection module 22 consults keyword DB 23 and acquires the nickname "tana" of the user who registered "Tanaka" as a keyword. Next, the keyword-detection module 22 compares the nickname "katz" of the call source user with the nickname "tana" of the called user. Since the two do not match, the keyword-detection module 22 notifies the monitor module 33 of both nicknames and the channel name.

The monitor module 33 first judges whether the called user terminal is booted up. If the called user terminal is not running, the monitor module 33 notifies the reporting module 29 to that effect. If the called user terminal is running, the monitor module 33 requests the called user terminal to detect the user status. In addition, the monitor module 33, in accordance with the request, stands by for user status notification from the called user terminal. If the monitor module 33 is notified of the user status by the user terminal, it sends the reported user status to the reporting module 29.

The reporting module 29 consults the report destination DB 30 and specifies the report destination for the determined user status, likewise as with the reporting module 9 in the first embodiment. However, the report destination DB 30 differs from the first embodiment in that it is configured to store a report destination table 10 of the first embodiment each user connected to the proxy terminal via the network.

FIG. 17 shows an example of the report destination DB 30. The nicknames of users connected to the proxy terminal, the nicknames of call source users and the nicknames of report destination users are correlated and stored in the report destination DB 30. For example, consider the case in which the user whose nickname is "katz" utters the keyword of the user whose nickname is "tana." The reporting module 29 searches the report destination DB using the nickname "tana" as a key, and acquires the report destination table of the called user "tana." Next, the reporting module 29 reads the report destination set for the call source user "katz." In FIG. 17, the nicknames "katz" and "suzu" are set as the report destinations.

In addition, the reporting module 29 determines the text message to be reported based on the reported user status and the content of the schedule DB 31, likewise as with the reporting module 9 in the first embodiment. However, the present embodiment differs from the first embodiment in that the schedules of all users connected to the proxy terminal are stored in the schedule DB 31.

(2) User Terminal

The status-detection section 24 is provided with an event-detection module 25, a screen saver detection module 26 and a recording module 27. The status-detection section 24 detects through the event-detection module 25 and the screen saver detection module 26 whether keyboard or mouse user input is directed to the chat client, and whether the screen saver is operating, likewise as with the status-detection section 4 in the first embodiment. In addition, the results of the detection are recorded in an event table. However, the present embodiment differs from the first embodiment in that the status-detection section 24 detects the user status in accordance with a request from the monitor module 33 of the proxy terminal, and notifies the proxy terminal of the detected user status.

The display module 32 displays on the screen an icon that indicates the reported user status, likewise as with the first embodiment.

Process Flow

Figure 18:
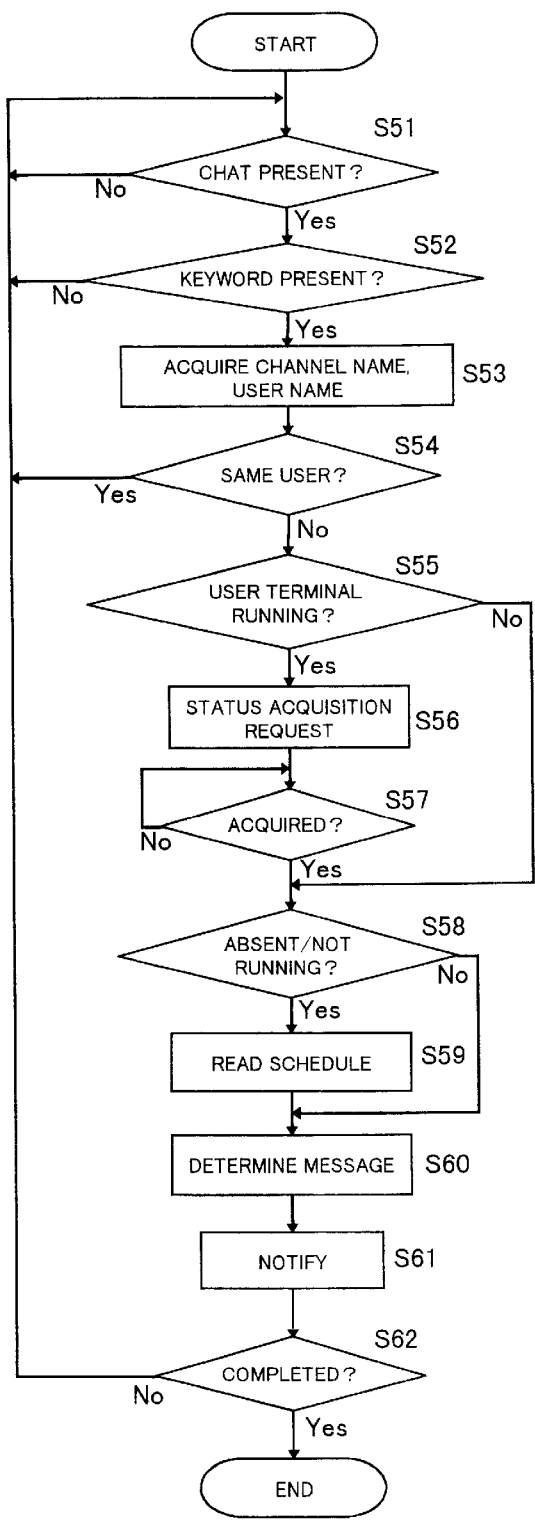
FIG. 18 is a flowchart illustrating flow of a routine that the proxy notification device in the second embodiment executes.

The following explains the processes executed in the status notification system. FIG. 18 is a flowchart illustrating the main routine executed by the proxy terminal in the present embodiment. The following routine is initiated by loading the chat client in the proxy terminal or by connecting the chat client to the chat server.

In step S51, the event-detection module 25 judges whether there has been a remark in any channel. If there has been a remark, the process flow goes to step S52. If there has not been a remark, the decision is re-executed. In other words, in step S51, the keyword-detection module 22 stands by for a remark on any channel.

In step S52, the keyword-detection module 22 judges whether the keyword of any user is included in a remark. Consulting keyword DB 23 carries out this decision. If it is judged that the keyword of any user is included in a remark, the process flow goes to step S53. If it judged that no keyword of any user is included in a remark, the process flow returns to step S51, and the keyword-detection module 22 stands by for the next remark.

In step S53, the keyword-detection module 22 acquires from the chat client the nickname of the call source user that uttered the keyword, the nickname of the user called by the keyword utterance and the call source channel on which the remark occurred.

In step S54, the keyword-detection module 22 judges whether the call source user and the called user are the same user. If the two users are different users, the call source user, the called user and the call source channel name are reported to the monitor module 33, and the process flow goes to step S55. If the call source user and the called user are the same user, the process flow returns to step S51, and the keyword-detection module 22 stands by for the next remark.

In step S55, the monitor module 33 judges whether the called user's user terminal is running. If the called user's user terminal is not running, the process flow goes to step S58, discussed later. If the called user's user terminal is running, the process flow goes to step S56 for detecting the status of the called user.

In step S56, the monitor module 33 requests the called user terminal to detect the user status.

In step S57, the monitor module 33 stands by for a response to the request, and the process flow goes to step S58 when the user status is acquired.

In step S58, the monitor module 33 sends to the reporting module 29 the user status of the called user acquired from the user terminal. In addition to the user status, the call source user and the call source channel are also sent. The reporting module 29 that receives the user status judges whether the user status is "absent." If the user status is "absent," the process flow goes to step S59. If not "absent," the process flow goes to step S60 discussed later.

In step S59, the reporting module 29 reads the schedule of the called user from the schedule DB 31.

In step S60, the reporting module 29 determines the text message to be reported to the call source user based on the user status and the user schedule.

In step S61, the reporting module 29 reads the report destination DB 30 based on the nickname of the called user, and specifies the text message report destination. Next, the reporting module 29 reports the text message and status information to the determined report destination. At the user terminal that receives the text message and status information, the display module displays the reported text message and changes the icon.

Step S62 judges whether the chat client program is finished; if finished, the present routine ends. If the chat client program is not finished, the process flow returns again to step S51 and the routine is repeated.

The process flow at the user terminal is to detect the real-time status of the user called by another user, and to give notification, likewise as with the judge status routine in the first embodiment. However, the present embodiment differs from the first embodiment in that user terminals perform the judge status routine in accordance with requests from the proxy terminal, and in that the proxy terminal notifies the user terminals of the user situations/status.

Other Embodiments

A proxy terminal is provided in the second embodiment, and that proxy terminal is provided with a chat client and a proxy reporting device. However, a form is also possible that provides the proxy reporting device in an information terminal operated by the chat server. In this case, the keyword-detection module 22 acquires remarks on the channel from the chat server. Moreover, the reporting module 29 issues text messages via the chat server.

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. A communication support system wherein communication devices are enabled for simultaneous bi-directional communication over a network, the communication support system comprising:

a first storage means for storing predetermined text information correlated with a second of the communication devices on the network;

a detection means for detecting a sending of any of the text information stored in said first storage means, where the sending is from a first communication device on the network;

a decision means for judging a status of a user of the second communication device in accordance with the detection of the text information, based on a status of the second communication device correlated with the detected text information;

a second storage means for storing a predetermined correlation between the first communication device and a set of one or more communication devices from among the communication devices on the network; and a reporting means for sending the user status to the network to which the text information was sent, said reporting means determining a report destination for the user status in accordance with said second storage means, and reporting the user status to the report destination via the network, where the report destination is the set of one or more communication devices.

2. The communication support system set forth in claim 1, further comprising:

a third storage means for storing user schedules correlated with the communication devices; and wherein the user status to be sent to the network is further judged based on a user schedule corresponding to the second communication device.

3. The communication support system set forth in claim 1, further comprising:

an acquisition means for detecting whether the second communication device is operating, and acquiring the user status from said decision means in accordance with the detecting.

4. The communication support system set forth in claim 1, further comprising:

a display means for visually displaying a status of each user sharing the network, enabled for changing the displayed status of the user of the second device in accordance with the user status sent from the network.

5. A status notification device used together with a communication device that is simultaneous, bi-directional communication-enabled, wherein a plurality of users mutu ally share a network, the status notification device being provided with:

a first storage means for storing predetermined text information;

a detection means for detecting that any of the text information has been sent from another communication device on the network by comparing the sent text information with the predetermined text information;

a decision means for judging a user status of a user of the communication device in accordance with the detection of the text information, based on a status of the communication device;

a second storage means for storing a predetermined correlation between a communication device that sent the text information and a set of one or more communication devices from among the communication devices on the network; and a reporting means for sending the user status over the network through which the text information was sent, said reporting means determining a report destination for the user status in accordance with said second storage means, and reporting the user status to the report destination via the network, where the report destination is the set of one or more communication devices.

6. A proxy device used by a communication device that is simultaneous, bi-directional communication-enabled wherein a plurality of users mutually share a network, the proxy device comprising:

a first storage means for storing a predetermined correlation between text information and a second communication device;

a detection means for detecting a sending of any of the text information from a first communication device on a network, where the sent text information matches the predetermined text information;

an acquisition means for detecting whether the second communication device correlated with the detected and sent text information is operating, and acquiring from the second communication device a user status of the second communication device in accordance with the detecting;

a second storage means for storing a predetermined correlation between the first communication device that sent the text information and a set of one or more communication devices from among the communication devices on the network; and a reporting means for sending over the network through which the text information was sent, said reporting means determining a report destination for the user status in accordance with said second storage means, and reporting the user status to the report destination via the network, where the report destination is the set of one or more communication devices.

7. A communication support system wherein communication devices that are enabled for simultaneous bi-directional communication over a network, the communication support system comprising:

a first storage means for storing predetermined text information correlated with at least one of the communication devices on the network;

a detection means for detecting sending of any of the text information stored in said first storage means, where the sending is from a first communication device on the network;

a decision means for judging a status of a user of a second communication device in accordance with the detection of the text information, based on a status of the second communication device correlated with the detected text information;

a second storage means for storing a schedule of the user of the second communication device, wherein the user status is further based on the schedule; and a reporting means for sending the user status over the network.

8. A status notification device used together with a communication device that is simultaneous, bi-directional communication-enabled, wherein a plurality of users mutually share the same network, the status notification device being provided with:

a first storage means for storing predetermined text information;

a detection means for detecting that any of the text information has been sent from another communication device on the network by comparing the sent text information with the predetermined text information;

a decision means for judging a user status of a user of the communication device in accordance with the detection of the text information, based on a status of the communication device;

a second storage means for storing a schedule correlated with the second communication device, wherein the user status to be sent to the network is further based on the schedule; and a reporting means for sending the user status over the network.

9. A proxy device used by a communication device that is simultaneous, bi-directional communication-enabled wherein a plurality of users mutually share a network, the proxy device comprising:

a first storage means for storing a predetermined correlation between text information and a second communication device;

a detection means for detecting a sending of any of the text information from a first communication device on a network, where the sent text information matches the predetermined text information;

an acquisition means for detecting whether the second communication device correlated with the detected and sent text information is operating, and acquiring from the second communication device a user status of the second communication device in accordance with the detecting;

a second storage means for storing a schedule correlated with the second communication device, wherein the user status to be sent to the network is further based on the schedule; and a reporting means for the user status over the network.

10. A computer readable recording medium on which is recorded a status notification program used together with a communication device that is simultaneous, bi-directional communication-enabled wherein a plurality of users mutually share a network, the status notification program capable of performing a process comprising:

storing predetermined text information correlated with the communication device;

detecting a sending of the text information from another communication device on the network;

judging, in accordance with the detection of the text information, a user status of a user of the communication device based on a status of the communication device;

storing a user schedule correlated with the communication device, wherein the user status to be sent to the network is further based on the schedule; and sending the user status over the network.

11. A computer readable recording medium on which is recorded a proxy notification program wherein a plurality of users mutually share a same network, used in a communication device that is simultaneous, bi-directional communication-enabled, the proxy notification program capable of performing a process comprising:

storing a predetermined correlation between text information and a second communication device;

detecting the sending of any text information from a first communication device on the network;

finding, in response to the detecting of the sending of the text information detection, whether the second communication device correlated with the detected text information is operating, and acquiring a user status of a user of the second communication device in accordance with the detecting;

storing a user schedule correlated with the communication device, wherein the user status to be sent to the network is further based on the schedule; and sending the user status based on the detecting, to the set of one or more communication devices.

12. A method, comprising:

receiving a text message directed to a networked text discussion;

detecting in the text message a nickname of a participant in the discussion;

in response to the detecting, automatically determining a status of the participant;

detecting in the text message at least one of a name and a nickname of a sender of the text message;

matching the at least one of the name and the nickname of the sender to one or more other participants in the networked text discussion; and sending the status to the one or more other participants in the discussion.

13. A method according to claim 12, wherein the status of the participant is determined by referring to a schedule of the participant.

14. A method of automatically detecting and propagating a status of a user in a chat session, comprising:

receiving a chat message sent to a client used by the user to participate in the chat session;

detecting in the chat message a pre-determined nickname of the user and a pre-determined nickname of a sender of the chat message;

automatically determining a user status of the user by referring to a schedule of the user; and determining a set of recipients to receive the user status by referring to the pre-determined nickname of the sender of the chat message.

* * * * *